United States Patent
Chen et al.

(10) Patent No.: US 12,437,045 B2
(45) Date of Patent: Oct. 7, 2025

(54) METHOD AND SYSTEM USING CONDITIONAL BLOCKING AND NON-BLOCKING QUERY CALL SYSTEM AND METHOD

(71) Applicant: Visa International Service Association, San Francisco, CA (US)

(72) Inventors: Yuexi Chen, San Francisco, CA (US); Brian Sullivan, San Francisco, CA (US); Dinah Sloan, San Francisco, CA (US); Hao Ngo, San Francisco, CA (US); Kiushan Pirzadeh, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 309 days.

(21) Appl. No.: 18/044,467

(22) PCT Filed: Sep. 29, 2021

(86) PCT No.: PCT/US2021/052740
§ 371 (c)(1),
(2) Date: Mar. 8, 2023

(87) PCT Pub. No.: WO2022/103505
PCT Pub. Date: May 19, 2022

(65) Prior Publication Data
US 2023/0334133 A1    Oct. 19, 2023

Related U.S. Application Data

(60) Provisional application No. 63/113,142, filed on Nov. 12, 2020.

(51) Int. Cl.
*G06F 21/32* (2013.01)
*G06F 21/62* (2013.01)
*G06V 40/12* (2022.01)

(52) U.S. Cl.
CPC .............. *G06F 21/32* (2013.01); *G06F 21/62* (2013.01); *G06V 40/1365* (2022.01); *G06F 2221/2141* (2013.01)

(58) Field of Classification Search
CPC .......... G06F 21/32; G06F 21/34; G06F 21/62; G06F 2221/2141; H04W 12/06; G06Q 20/352; G06Q 20/40145
See application file for complete search history.

(56) References Cited

U.S. PATENT DOCUMENTS 8,694,793 B2    4/2014  Evans
9,584,964 B2 *  2/2017  Pelkey ................ H04W 12/065
(Continued)

FOREIGN PATENT DOCUMENTS

EP    3680844 A1    7/2020

OTHER PUBLICATIONS

"FIDO Alliance", Wikipedia, The Free Encyclopedia, Available online at https://en.wikipedia.org/w/index.php?title=FIDO_Alliance &oldid=987310135, Nov. 6, 2020, pp. 1-4.
(Continued)

*Primary Examiner* — Eric W Shepperd
(74) *Attorney, Agent, or Firm* — Kilpatrick Townsend & Stockton LLP

(57) ABSTRACT

A method performed by at least a user device comprising an interaction application and a biometric application is disclosed. The method comprises receiving from an access device, a message comprising interaction details. The user device may perform a biometric verification of the user operating the user device. The method may then include, if the biometric application has a biometric verification result, the interaction application receives the biometric verification result from the biometric application and continues processing the message. Or if the biometric application does
(Continued)

not have the biometric verification result, then the interaction application either waits for the biometric verification result from the biometric application or continues processing the message without the biometric verification result.

20 Claims, 5 Drawing Sheets

(56) References Cited

U.S. PATENT DOCUMENTS

| | | | | |
|---|---|---|---|---|
| 10,057,227 | B1* | 8/2018 | Hess | G06F 21/31 |
| 10,262,322 | B2 | 4/2019 | Lee et al. | |
| 2004/0186995 | A1* | 9/2004 | Yim | H04N 21/4415 |
| | | | | 713/168 |
| 2011/0000962 | A1* | 1/2011 | Chan | G07B 15/00 |
| | | | | 235/382 |
| 2015/0350200 | A1 | 12/2015 | Li et al. | |
| 2016/0267486 | A1 | 9/2016 | Mitra et al. | |
| 2016/0364730 | A1* | 12/2016 | Rans | G06Q 20/40145 |
| 2019/0260742 | A1* | 8/2019 | Arora | H04W 12/65 |
| 2019/0307647 | A1* | 10/2019 | Greenspan | G16H 10/60 |
| 2019/0332878 | A1* | 10/2019 | Li | G06V 40/1365 |
| 2020/0065799 | A1 | 2/2020 | Lu et al. | |
| 2020/0286061 | A1* | 9/2020 | Wang | G06Q 20/4014 |
| 2020/0302426 | A1 | 9/2020 | Lu et al. | |

OTHER PUBLICATIONS

EP21892525.3, "Extended European Search Report", Apr. 2, 2024, 11 pages.

PCT/US2021/052740, "International Search Report and Written Opinion", Jan. 19, 2022, 11 pages.

* cited by examiner

METHOD AND SYSTEM USING CONDITIONAL BLOCKING AND NON-BLOCKING QUERY CALL SYSTEM AND METHOD

CROSS-REFERENCES TO RELATED APPLICATIONS

This application is a National Stage of International Application No. PCT/US2021/052740, filed on Sep. 29, 2021, which claims priority to and the benefit of U.S. Provisional Patent Application No. 63/113,142 filed on Nov. 12, 2020, which are incorporated herein by reference its their entirety.

BACKGROUND

Contactless cards with biometric sensors can be used for transactions. For example, a user holding a user device such as a contactless payment card may use the card to complete a contactless transaction. The contactless transaction may require the user to execute some user verification mechanism (e.g., if the biometric sensor is a fingerprint sensor, the required user verification mechanism may be a fingerprint match) in order to complete the transaction. The user verification mechanism helps to improve transaction security (e.g., reducing payment fraud), but may require several hundred milliseconds or up to several seconds to complete. For example, a fingerprint match process may comprise steps including finger detection, fingerprint capture, and match determination between the captured fingerprint against an enrolled template. This process could amount to several seconds. The added processing time required to perform the user verification mechanism can degrade the user's transaction experience, which may be completed (without the user verification mechanism) within four hundred milliseconds. In some contactless transaction scenarios, such as at a mass transit gate (e.g., a train station, bus station, etc.), the transaction processing speed is important since many transit gates require of processing time of three hundred milliseconds or less to allow sufficient throughput for the large volume of users. There is thus a need to balance speed with transaction security.

Another complicating factor is that different types of user devices may have different types of sensors, manufactured by different manufacturers. Thus, not all users devices that are used at a mass transit gate process data at the same speed.

Embodiments of the invention address these and other problems, individually and collectively.

BRIEF SUMMARY

One embodiment of the invention includes a method. The method comprising: receiving, by an interaction application on a user device from an access device, a message; performing, by a biometric application on the user device, a biometric verification of the user operating the user device; if the biometric application has a biometric verification result, then the interaction application receives the biometric verification result from the biometric application and continues processing the message; and if the biometric application does not have the biometric verification result, then, the interaction application either (i) waits for the biometric verification result from the biometric application or (ii) continues processing the message without the biometric verification result.

Another embodiment is related to a user device comprising: a processor; and a non-transitory computer readable medium comprising code executable by the processor for a method comprising: receiving, by an interaction application on the user device from an access device, a message; performing, by a biometric application on the user device, a biometric verification of the user operating the user device; if the biometric application has a biometric verification result, then the interaction application receives the biometric verification result from the biometric application and continues processing the message; and if the biometric application does not have the biometric verification result, then, the interaction application either (i) waits for the biometric verification result from the biometric application or (ii) continues processing the message without the biometric verification result.

Yet another embodiment is related to a method comprising: transmitting, by an access device to a user device, a transfer instruction message, wherein the user device performs a biometric verification of the user operating the user device and determines if a verification method is required to continue with the transfer instruction message and if the verification method is required the user device performs a blocking call, or if the verification method is not required the user device performs a non-blocking call; and receiving, by the access device from the user device, a biometric verification result or an indication that the biometric verification result is not available/completing, by the access device, the transfer instruction message.

These and other embodiments are described in further detail below.

DETAILED DESCRIPTION

Figure 1:
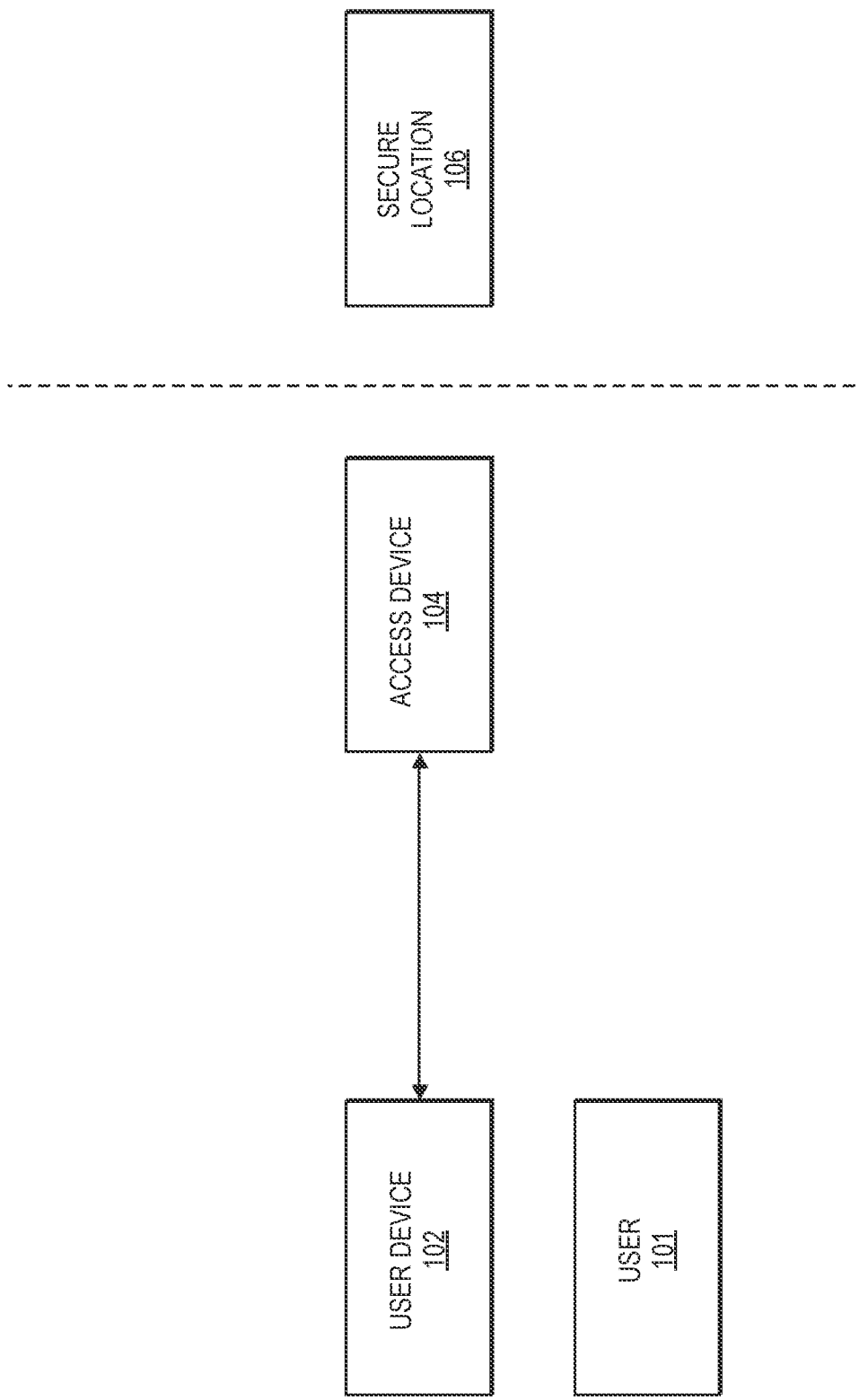
FIG. 1 shows a block diagram of a system for a user performing a contactless interaction with an access device.

Before discussing embodiments of the invention, the discussion of some terms may be helpful.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data (e.g., a secure data interaction), a secure webpage (e.g., a secure webpage interaction), a secure location (e.g., a secure location interaction), and the like. In other embodiments, an interaction can include a payment transaction in which two devices can interact to facilitate a payment.

"Interaction data" may be data associated with an interaction. For example, an interaction may be a transfer of a digital asset from one party to another party. In some embodiments, an interaction can include a transaction between a user and a resource provider. Interaction data, for example, may include a transaction amount. In some embodiments, interaction data can indicate different entities that are party to an interaction as well as value or information being exchanged. Interaction data can include an interaction amount, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data. Interaction data may also include information whether a CVM (cardholder verification method) is attempted/successful, and which type of CVM was used.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card (e.g., a payment card such as credit, debit, or a prepaid card) with magnetic stripes, contact chips, or contactless elements (e.g., including contactless chips and antennas), a personal digital assistant (PDA), a laptop computer, a desktop computer, a server computer, a vehicle such as an automobile, a thin-client device, a tablet PC (personal computer), etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G (third generation), 4G (fourth generation) or similar networks), Wi-Fi, Wi-Max, or any other communication medium that may provide access to a network such as the Internet or a private network.

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth Low Energy (BLE), Wi-FI, iBeacon, etc.

An "application" may be a computer program that is used for a specific purpose. Examples of applications may include payment applications, transit applications, secure data access applications, banking applications, digital wallet applications, event ticketing applications, loyalty rewards applications, etc.

An "authenticator" can include hardware and/or software utilized for authentication. An authenticator can include a biometric reader configured to process biometric information. An authenticator can obtain and process biometric information to authenticate the individual (e.g., user) associated with the biometric information. An authenticator can include a biometric reader. As used herein, biometric authentication and biometric verification may be used interchangeably.

A "biometric" may be any human characteristic that is unique to an individual. For example, a biometric may be a person's fingerprint, voice sample, face, DNA (deoxyribonucleic acid), retina, etc.

"Biometric information" can include data relating to a biometric. Biometric information can include biometric samples and/or biometric templates.

A "biometric sensor" may include a device for capturing data from an individual's biometric sample. Examples of biometric sensors may include fingerprint readers, front-facing cameras, microphones, and iris scanners. In some embodiments, a user device may comprise a biometric sensor (e.g., a fingerprint scanner, a palm reader, a vein reader).

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric verification process. For example, a biometric template may be a binary mathematical file representing the unique features of an individual's fingerprint, eye, hand or voice needed for performing accurate authentication of the individual.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

"Access data" may include any suitable data that can be used to access a resource or create data that can access a resource. In some embodiments, access data may be account information for a payment account. Account information may include a PAN, payment token, expiration date, verification values (e.g., CVV (card verification value), CVV2 (card verification value 2), dCVV (dynamic card verification value), dCVV2 (dynamic card verification value 2)), etc. In other embodiments, access data may be data that can be used to activate account data. For example, in some cases, account information may be stored on a user device, but may not be activated until specific information is received by the user device. In other embodiments, access data could include data that can be used to access a location. Such access data may be ticket information for an event, data to access a building, transit ticket information, etc.

A "blocking call" can include a software instruction that results in the program, application, or subroutine being called to wait for a predetermined amount of time or until additional processing such as biometric processing occurs.

A "non-blocking call" can include a software instruction that results in the program, application, or subroutine being called to respond immediately without waiting for additional processing such as biometric processing to occur.

FIG. 1 shows a block diagram of a system for a user 101 performing a contactless (or contact) interaction with an access device 104. The user 101 may operate a user device 102. The user 101 may interact (e.g., transact) with a resource provider operating the access device 104 to access a secure location 106, such as a building or transit area maintained by the resource provider. The access device 104 may have a gate (e.g., a transit gate) that actuates and allows or does not allow a person into the secure location 106.

In some embodiments, the user device 102 may communicate with the access device 104 using contactless communication, in which data is exchanged between two devices without the need for the devices to be physically coupled. Examples of contactless communications can include data transmissions that use near-field communication (NFC) transceivers, lasers, radio frequency transceivers, infrared devices, radio frequency or wireless communication protocols such as Bluetooth, Bluetooth Low Energy (BLE), Wi-FI, or iBeacon, etc.

The user 101 may begin an interaction by presenting the user device 102 to the access device 104. In some embodiments, the user device 102 may be a card, such as a payment card, that comprises an interaction application (e.g., a payment application that allows the user device 102 to complete interactions such as transactions, a transit application that allows the user device 102 to complete interactions specific to transit, etc.) and a biometric application (e.g., an application that allows the user device 102 to perform biometric verifications). The interaction application and biometric application may be installed on the user device 102 prior to completing interactions and/or biometric verifications of the user. The interaction application and biometric application may communicate internally with each other. The biometric application may additionally communicate with a biometric sensor (e.g., a fingerprint scanner, a camera, a microphone, etc.) on the user device 102.

After detecting the user device 102, the access device 104 may begin an interaction with the user device 102. For example, after the user device 102 and the access device 104 establish a contactless communication channel, the access device 104 may transmit a message (e.g., a payment request message) to the user device 102 to begin an interaction (e.g., the payment associated with the payment request message) described in FIG. 2.

Figure 2:
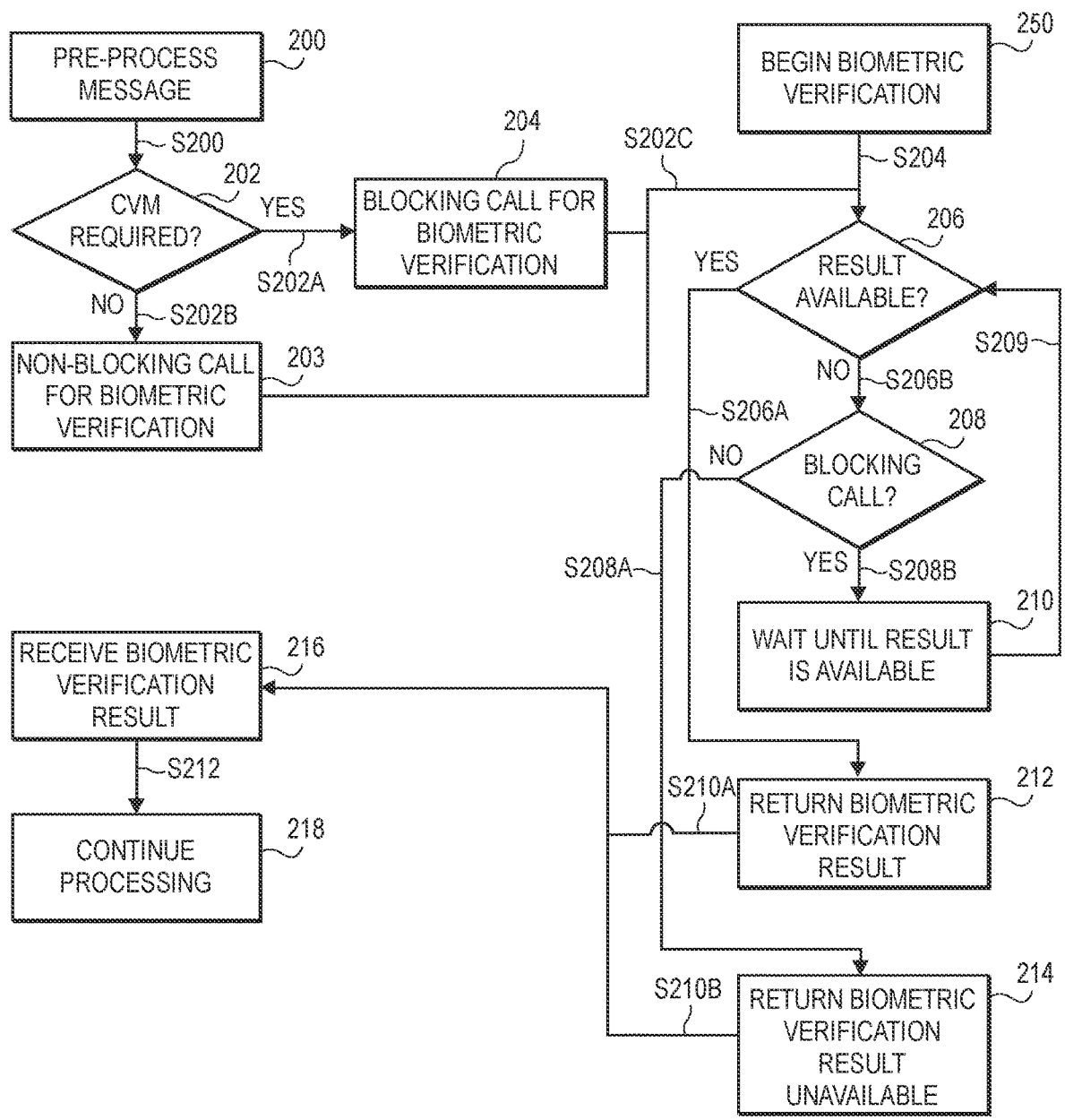
FIG. 2 shows a flow chart for a user device comprising an interaction application and a biometric application performing a contactless interaction with an access device.

FIG. 2 shows a flow chart for a user device comprising an interaction application and a biometric application performing an interaction with an access device. The user device and access device may be similar to those described in FIG. 1. The user device may receive a message from an access device that is used to begin an interaction. The message may be read by the interaction application on the user device, which will begin to process the interaction. In some embodiments, the user device may be a payment card, and the message may be a payment request message that comprises transaction details (e.g., an access device identifier, a transaction amount, resource provider name, etc.). The payment application on the user device may process the payment request message, to provide payment in order to access a resource provided by the resource provider operating the access device.

At block 200, after receiving the message from the access device, the interaction application on the user device may begin pre-processing the message. In some embodiments, pre-processing the message may comprise transmitting or invoking instructions to the biometric application on the user device to begin a biometric verification of the user operating the user device. When the user device is a payment card and the interaction application is a payment application, processing the message may comprise reading the message, which may be a get processing options (GPO) message that initiates a transaction to be completed by the payment application. Note that for contact based embodiments, the message may be a GPO or generate application cryptogram message. Other types of messages are also possible. After completing pre-processing of the message, in step S200, the interaction application may begin processing the message.

At block 250, after receiving the message from the access device, the biometric application installed on the user device may begin a biometric verification of the user operating the user device in step S204. The biometric application may allow the user to conduct a biometric measurement (e.g., measure a fingerprint) using a biometric sensor (e.g., a fingerprint scanner) on the user device. The biometric application may read a biometric measurement from the biometric sensor, and compare the biometric measurement to a biometric template stored on the user device. The biometric application may then determine if the biometric measurement and the biometric template match (e.g., if the fingerprint measured is the same or similar to a fingerprint stored in memory). The biometric verification result (e.g., match or no match) may then be temporarily stored in memory until the interaction application queries for the result.

At block 202, after completing pre-processing of the message, the interaction application may determine if a cardholder verification method (CVM) is required. The cardholder verification method may be a biometric verification. In some embodiments, the interaction application may access transaction details using the get processing options message sent by the access device, which may determine if the cardholder verification method is required. In other embodiments, the access device identifier in the message may be used to identify the type of access device (e.g., if the access device is a transit access device). The type of access device may determine if the cardholder verification method is required, and what type of call (a verification call such as a blocking or non-blocking call) is to be made.

If the access device is identified to be a merchant access device (e.g., if the access device is a payment terminal at a merchant), the interaction application may determine that the cardholder verification method is required. The interaction application may then, in step S202A and block 204, generate a blocking call which will require the biometric verification to be completed in order to complete the interaction. In step S202C, the interaction application may then provide the blocking call to the biometric application to proceed to block 206.

In some embodiments, the access device maybe identified as one that does not require cardholder verification (e.g., an access device at a mass transit gate), the interaction application may determine that the cardholder verification method is not required. The interaction application may then, in step S202B and block 203, generate a non-blocking call which will not require a biometric verification to be completed in order to complete the interaction. In step S202C, the interaction application may then transmit the non-blocking call to the biometric application to proceed to block 206.

At block 206, after receiving the blocking or non-blocking call from the interaction application, the biometric application may check if the biometric verification result is available. The biometric verification may have been initiated at the same time as the pre-processing of the message, or at the beginning of block 206.

If the biometric verification has been completed, in step S206A, the biometric application may proceed to block 212 to retrieve the biometric verification result stored at block 250. In step S210A, the biometric application may transmit the biometric verification result to the interaction application to proceed to block 216.

If the biometric verification has not yet been completed, in step S206B, the biometric application may proceed to block 208 to determine if the call received is a blocking call.

At block 208, the biometric application may check if the call received in step S202C is a blocking call.

If the call was a non-blocking call, the interaction application does not need a cardholder verification method to complete processing the interaction. In step S208A, the biometric application may proceed to block 214 to generate a biometric verification result unavailable response. In step S210B, the biometric application may transmit the biometric verification result unavailable response to the interaction application to proceed to block 216.

If the call was a blocking call, the interaction application requires the cardholder verification method to complete processing the interaction. In step S208B, the biometric application may proceed to block 210 to wait for the biometric verification result. In step S209, after a predetermined amount of time, the biometric application may return to block 206 to check if the biometric verification result is available. The predetermined amount of time may be comparable to the average time that the biometric application takes to perform the biometric verification. For some biometric verification systems that include biometric detection, capture, and match, the average time may be on the order of two hundred milliseconds. If the biometric application takes too long (e.g., the sensor malfunctions, etc.), then the biometric application may proceed from block 210 to block 214.

At block 216, after receiving either the biometric verification result in step S210A, or the biometric verification result unavailable response from the biometric application in step S210B, in step S212, the interaction application may proceed to block 218 to continue processing the message.

At block 218 the interaction application may continue processing the message. For example, when the message is a payment request message, the interaction application may complete the transaction with the access device, which may comprise providing access data such as a credential (e.g., an account number, a social security number, a user identifier, etc.), payment account information (e.g., a primary account number (PAN) or payment token, expiration date, etc.), ticket information, a bade ID number, etc. in another message from the user device to the access device so that the access device may complete a transaction. In some embodiments, the access data, along with the biometric verification result (or biometric verification result unavailable) may additionally be signed using a signing key stored on the user device. In some embodiments, another message received by the access device may include a credential such as an account number in a payment transaction. The access device may then generate an authorization request message comprising the credential. The access device may transmit the authorization request message to an authorizing entity computer (e.g., an issuer computer) via an acquirer computer and a payment processing network to authorize the transaction. An authorization response message may be transmitted from the authorizing entity computer to the access device via the acquirer computer and the payment processing network. After the authorization process, a clearing and settlement process for the transaction can take place between the authorizing entity computer, the acquirer computer, and the payment processing network.

In some embodiments, the access device may be a gate access device at a transmit terminal and may comprise a gate in the form of a metal arm or other movable barrier. In response to receiving another message, the gate can move allowing the user of the user device to enter into a secure location.

The flow illustrated in FIG. 2 assumes that a biometric verification result will be returned by the biometric application shortly after the call is received from the interaction application. In the event that the biometric application malfunctions or is otherwise unable to provide a result (e.g., if the sensor is damaged or is too dirty, or if the processing takes too long), then a "result unavailable" message as in step S210B may be returned to the interaction application by the biometric application.

Figure 3:
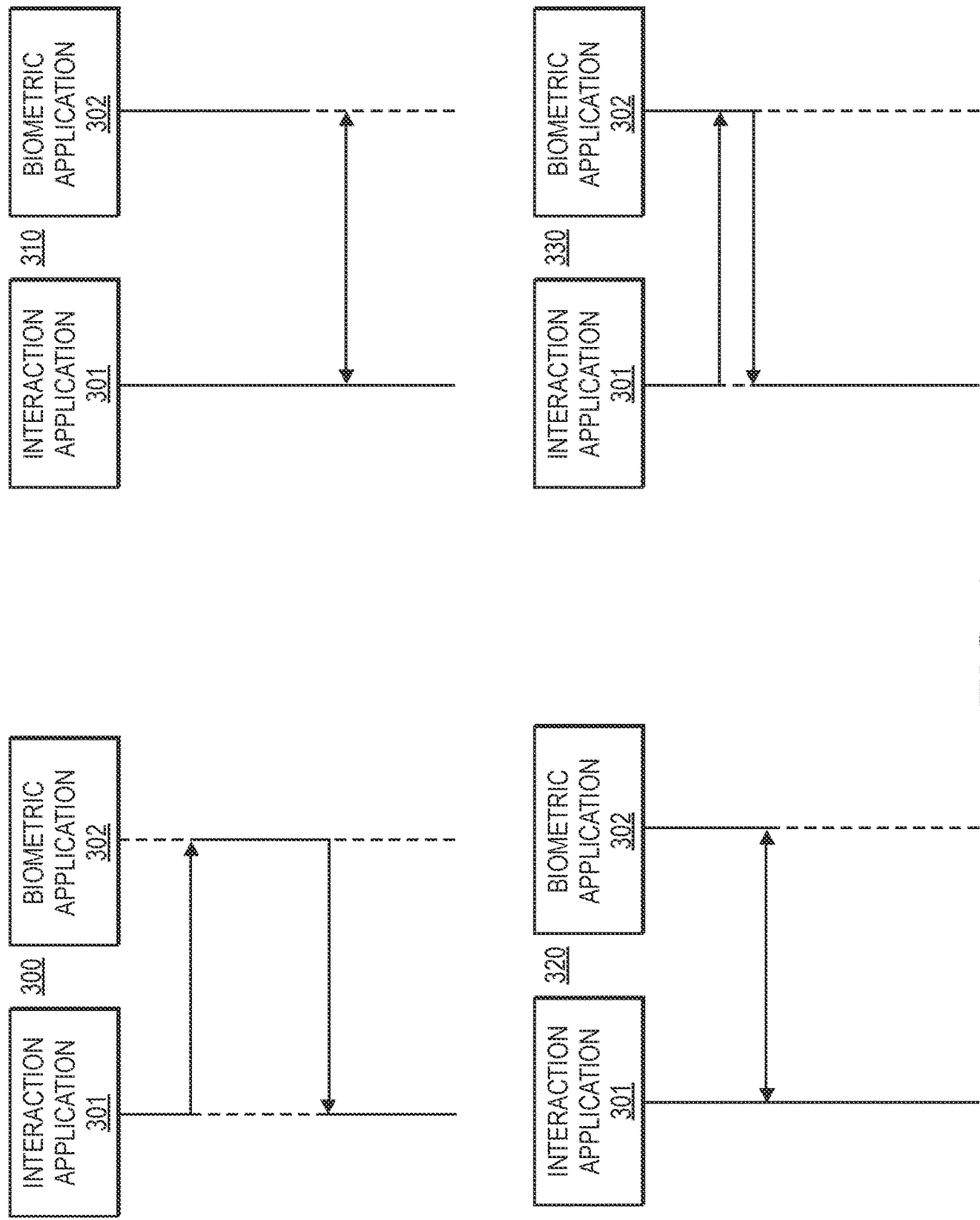
FIG. 3 shows timelines corresponding to interaction application and biometric application flows.

FIG. 3 shows timelines corresponding to interaction application and biometric application flows. The timelines shown in FIG. 3 may correspond to the flow described by FIG. 2. The timelines show processing times that correspond to various processing scenarios, and highlight time saving benefits of the invention. In FIG. 3, a solid line may indicate that the corresponding application is active in performing its function (e.g., processing the interaction or performing a biometric verification), and a dotted line may indicate that the corresponding application is on stand-by or has completed its function.

The first timeline 300 may correspond to traditional systems, where the biometric application 302 begins biometric verification only when called, and wherein every call is effectively a blocking call. The interaction application 301 may complete pre-processing of the interaction and make a call to the biometric application 302 for a biometric verification result, regardless of if the biometric verification result is required by an access device of the interaction. The biometric application 302 may begin and complete the biometric verification and responds with the result so that the interaction application 301 can complete processing the interaction.

The second timeline 310 and the third timeline 320 may correspond to the scenario in FIG. 2 where the interaction application 301 begins pre-processing of the message at block 200 and initiates the biometric verification at block 250 by the biometric application 302 (e.g., the interaction application 301 and the biometric application 302 run in parallel) and where the interaction application 301 transmits a non-blocking call to the biometric application 302. The biometric application 302 may or may not complete a biometric verification before the interaction application 301 makes a non-blocking call for the biometric verification result.

When the interaction application 301 transmits the non-blocking call to the biometric application 302 (e.g., in step S202C of FIG. 2), the biometric verification result may be available, and so the biometric application 302 may immediately respond by providing the biometric verification result to the interaction application 301 (e.g., following step S202C to S206A, and then to S210A in FIG. 2) as shown by the second timeline 310.

If the biometric application 302 has not completed a biometric verification, the biometric application 302 may immediately respond by providing a biometric verification result unavailable response (e.g., following step S202C to S206B, then to S208A and finally to S210B) as shown by the second timeline 310.

Thus, regardless if the biometric application 302 has a biometric verification result, the interaction application 301 may run unimpeded and complete processing the interaction. In many traditional systems, such as the one described by the first timeline 300, where the non-blocking call is not used and the interaction application 301 and biometric application 302 do not run in parallel, the interaction application 301 would waste a significant amount of time waiting for a biometric verification result that is not needed to complete the interaction between the user device and the access device, degrading the user's experience.

The fourth timeline 330 may correspond to the scenario in FIG. 2 where the interaction application 301 begins pre-processing of the message at block 200 and initiates the biometric verification at block 250 by the biometric application 302 (e.g., the interaction application 301 and the biometric application 302 run in parallel) and where the interaction application 301 transmits a blocking call to the biometric application 302. The interaction application 301 may complete pre-processing of the interaction and transmit a blocking call to the biometric application 302. The biometric application 302 had been completing the biometric verification in parallel but does not have a result at the time of the call. As a blocking call corresponds to the access device of the interaction requiring a cardholder verification method, the biometric application 302 may continue to run until the biometric verification is finished to send the result to the interaction application 301. The interaction application 301 may then complete processing the interaction using the biometric verification result provided by the biometric application 302.

In preferred embodiments, the interaction application 301 and the biometric application 302 run in parallel, which can provide time savings over many traditional systems, where the biometric application only begins to perform the biometric verification when called. This can be seen by the comparison between the first timeline 300 and the fourth timeline 330, where both calls made by the interaction application 301 are effectively blocking calls. In the first timeline 300, corresponding to traditional systems, the biometric application 302 only begins the biometric verification when called, whereas in the fourth timeline 330, the biometric application 302 runs in parallel, and so provides time savings over the first timeline 300. Additionally, by identifying the type of access device used in the interaction, the user device of the interaction may use logic of the interaction application 301 to generate a non-blocking call as illustrated in 320. The use of a non-blocking call can provide significant time savings in situations when a cardholder verification method is not required by the access device of the interaction. For example, at a mass transit gate, an access device may not require a cardholder verification method to process transactions, as the risk of fraud is low. Many traditional systems would still wait for the biometric application 302 to complete the biometric verification regardless if it was needed. The non-blocking call allows for the interaction to be completed by the interaction application 301 in scenarios which the cardholder verification method is not required. In addition, even if the cardholder verification method was not required, in a non-blocking call, the biometric application 301 may transmit the biometric verification result if it is available when it receives the non-blocking call. In a transaction, the interaction application 301 may still include the biometric verification result with the access data (the access data as described in the description of block 218), which gives the issuer operating the authorizing entity computer more frequent confirmations that the user has been authenticated than if the non-blocking call was not used.

TABLE 1

| Finger-print Match | CVM required by Terminal | Existing Solution | | Parallel Processing | | Parallel Processing with Blocking Call for CVM Required, Non-Blocking Call for CVM not Required | |
|---|---|---|---|---|---|---|---|
| | | Total time | Match Result Sent? | Total time | Match Result Sent? | Total time | Match Result Sent? |
| Best-Case | Yes | 350 ms | Y | 300 ms | Y | 300 ms | Y |
| | No | 350 ms | Y | 300 ms | N | 300 ms | Y |
| Normal-Case | Yes | 500 ms | Y | 300 ms | Y | 300 ms | Y |
| | No | 500 ms | Y | 300 ms | N | 300 ms | Y |
| Worst-Case | Yes | 1300 ms | Y | 1000 ms | Y | 1000 ms | Y |
| | No | 1300 ms | Y | 300 ms | N | 300 ms | N |

Time-saving benefits of the invention may further be described by the Table 1 above. Table 1 is a comparison table between the current solution, the improvement of parallel processing of the interaction application 301 and the biometric application 302, and the use of a conditional blocking and non-blocking call along with parallel processing. The middle column of "parallel processing" without a blocking or non-blocking call, assumes that both a biometric verification process and a transaction (e.g., payment transaction) process are occurring in parallel and that the interaction application 301 needs to wait for some response from the biometric application 302. The assumptions made are that the contactless interaction takes three hundred milliseconds (e.g., the interaction would take three hundred milliseconds if there was no biometric verification). The best-case scenario for the biometric verification takes fifty milliseconds, which occurs if the process was started before being called. The normal case for the biometric verification takes two hundred milliseconds, which occurs if the process starts when being called. The worst-case scenario biometric verification takes one thousand milliseconds, this occurs when the process times out and a biometric verification result (shown as match result in Table 1) is not able to be sent. As described, the improvement of parallel processing can provide significant time savings over the existing solution and is limited by the process that takes longer. In the non-blocking call case (e.g., cardholder verification method not required), the interaction is limited by the speed of the contactless interaction itself, and not by the biometric verification.

Figure 4:
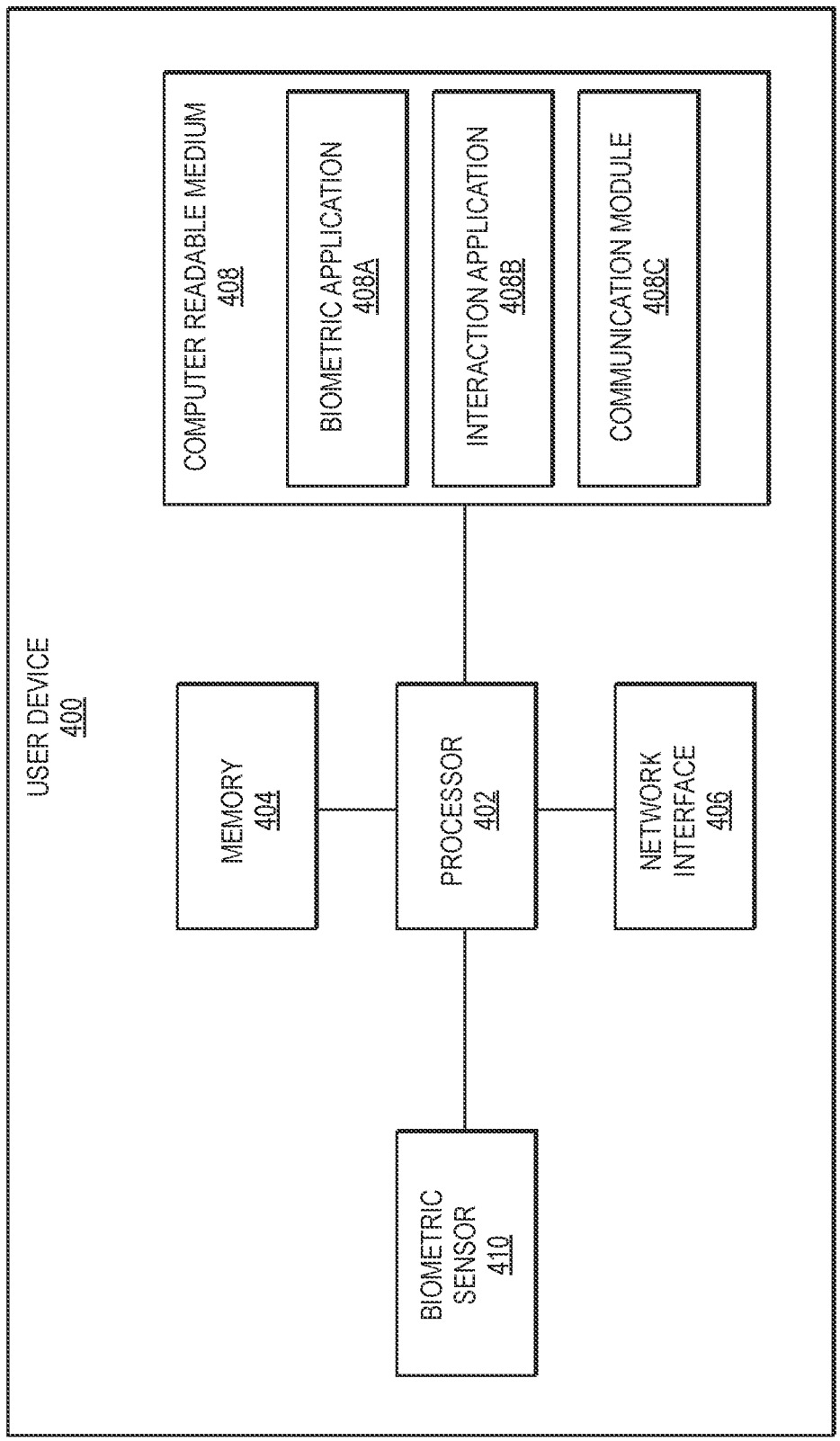
FIG. 4 shows a block diagram of an exemplary user device.

FIG. 4 shows a block diagram of an exemplary user device 400. The user device 400 may be operated by a user. The user device 400 may comprise a processor 402. The processor 402 may be coupled to a memory 404, a network interface 406, a computer readable medium 408, and a biometric sensor 410. The computer readable medium 408 may comprise any suitable number and types of software modules.

The memory 404 may be used to store data and code. The memory 404 may be coupled to the processor 402 internally or externally (e.g., via cloud based data storage), and may comprise any combination of volatile and/or non-volatile memory such as RAM (random access memory), DRAM (dynamic random access memory), ROM (read only memory), flash, or any other suitable memory device. In some embodiments, the memory 404 may securely store a biometric template and temporarily store a biometric measurement.

The network interface 406 may include an interface that can allow the user device 400 to communicate with external computers and/or devices. The network interface 406 may enable the user device 400 to communicate data to and from another device such as an access device. Some examples of the network interface 406 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 406 may include Wi-Fi. Data transferred via the network interface 406 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 406 and other devices via a communications path or channel. As noted above, any suitable communication path or channel may be used such as, for instance, a wire or cable, fiber optics, a telephone line, a cellular link, a radio frequency (RF) link, a WAN (wide area network) or LAN (local area network) network, the Internet, or any other suitable medium.

The computer readable medium 408 may comprise a number of software modules including, but not limited to, a biometric application 408A, an interaction application 408B, and a communication module 408C.

The computer readable medium 408 may comprise code, executable by the processor 402, for a method comprising: receiving, by the interaction application on a user device from an access device, a message; performing, by a biometric application on the user device, a biometric verification of the user operating the user device; if the biometric application has a biometric verification result, then the interaction application receives the biometric verification result from the biometric application and continues processing the message; and if the biometric application does not have the biometric verification result, then, the interaction application either (i) waits for the biometric verification result from the biometric application or (ii) continues processing the message without the biometric verification result.

The biometric application 408A may comprise code that causes the processor 402 to communicate with the biometric sensors 410 to perform a biometric verification. For example, the biometric application 408A may cause the processor 402 to activate the biometric sensors 410 and read an input biometric measurement. The biometric application 408A may access a biometric template stored in the memory 404 and compare the biometric measurement to the biometric template. The biometric application 408A may determine if the biometric measurement and the biometric template match, or are similar and generate a biometric verification result based on the match. The biometric application 408A may additionally generate a biometric verification result unavailable response.

The interaction application 408B may comprise code that causes the processor 402 to process interactions. In some embodiments, the interaction application 408B may be a payment application such as a digital wallet. The interaction application 408B may store data related to an account of the user operating the user device 400, such as payment account data. The interaction application 408B may receive messages from access devices that begin interactions, and process the message to complete the interaction.

The communication module 408C, in conjunction with the processor 402, can generate messages, forward messages, reformat messages, and/or otherwise communicate with other entities. For example, communication module 408C can be used to facilitate communications between the user device 400 and an access device.

The biometric sensor 410 may be used to input a biometric measurement unique to the user (e.g., a fingerprint). Examples of the biometric sensor 410 may be a camera, a microphone, a fingerprint sensor, etc.

Figure 5:
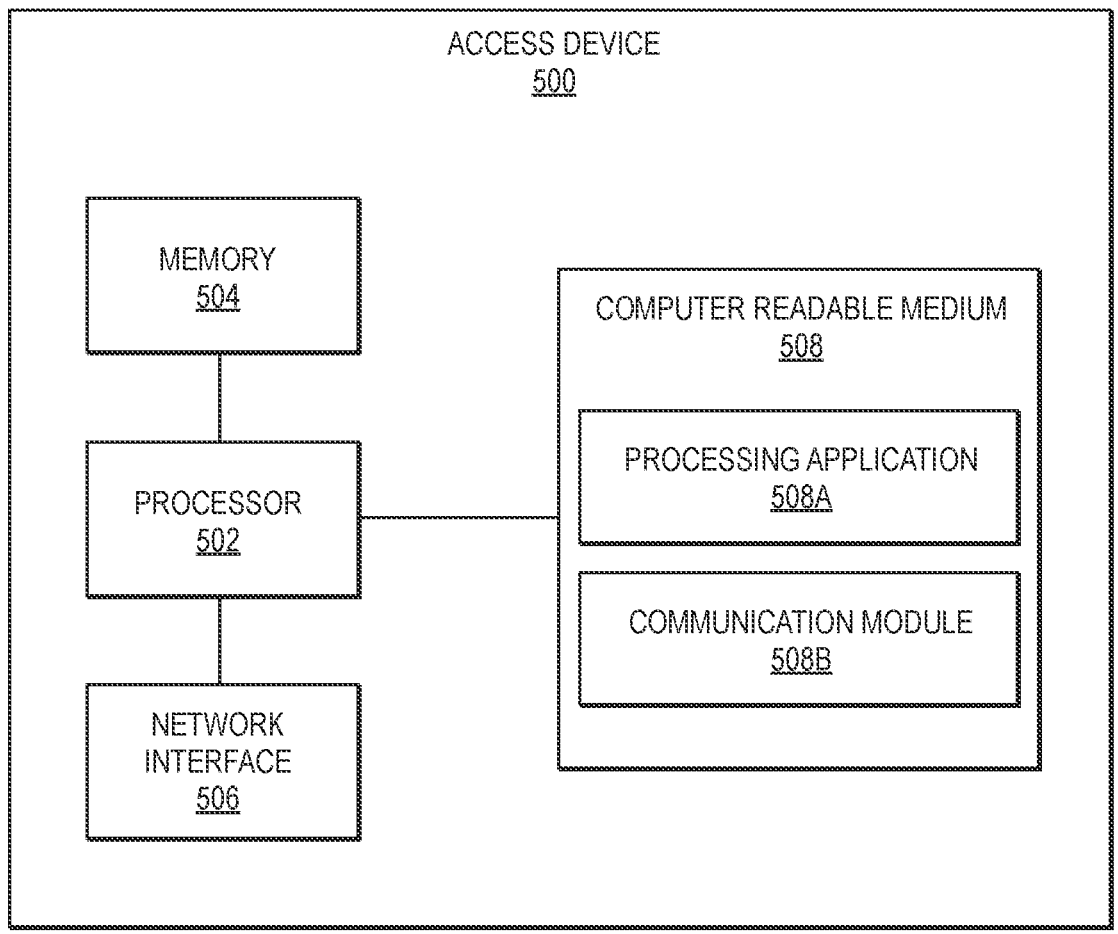
FIG. 5 shows a block diagram of an exemplary access device.

FIG. 5 shows a block diagram of an exemplary access device 500. The access device 500 may be operated by a resource provider, such as a merchant or transit gate. The access device 500 may comprise a processor 502. The processor 502 may be coupled to a memory 504, a network interface 506, and a computer readable medium 508. The computer readable medium 508 may comprise any suitable number and types of software modules.

The memory 504 and network interface 506 may have the same or different features to the previously described memory 404 and network interface 406.

The computer readable medium 508 may comprise code, executable by the processor 502, for a method comprising: transmitting to a user device, a message, wherein the user device receives the message at an interaction application on the user device, performs, by a biometric application on the user device, a biometric verification of the user operating the user device, and if the biometric application has a biometric verification result, then the interaction application receives the biometric verification result from the biometric application and continues processing the message, and if the biometric application does not have the biometric verification result, then, the interaction application either (i) waits for the biometric verification result from the biometric application before processing the message, or (ii) continues processing the message without the biometric verification result; and responsive to transmitting the message, receiving another message from the access device.

The processing application 508A may comprise code that causes the processor 508 to generate and process interactions. The processing application 508A may allow the access device 500 to generate a message relating to an interaction after detecting the presence of a user device. The message may comprise details relating to the interaction. For example, if the interaction is a transaction, the message may comprise transaction details. The processing application 508A may allow the access device 500 to receive access data from user devices, and process interactions associated with the access data. For example, the access device 500 may use the processing application 508A to communicate with an issuer indicated in the access data to complete a transaction between the user operating the user device and the resource provider operating the access device 500.

The communication module 508B may have the same or different features to the previously described network interface 408C.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method performed by at least a user device comprising a processor, and a computer readable medium comprising an interaction application and a biometric application, the method comprising:
   receiving, by the interaction application on the user device from an access device, a message;
   performing, by the biometric application on the user device, a biometric verification of a user operating the user device; and
   if the biometric application has a biometric verification result, then the interaction application receives the biometric verification result from the biometric application and continues processing the message, and
   if the biometric application does not have the biometric verification result, then, the interaction application either (i) waits for the biometric verification result from the biometric application before processing the message, or (ii) continues processing the message without the biometric verification result,
   wherein the biometric application does not have the biometric verification result, and the method further comprises:
      determining, by the interaction application on the user device, that a verification process is required to continue processing the message; and
      providing, by the interaction application to the biometric application, a blocking call, which causes the interaction application to wait for the biometric verification result from the biometric application before processing the message.

2. The method of claim 1, wherein the biometric verification is a fingerprint verification.

3. The method of claim 1, wherein the biometric verification of the user comprises measuring a biometric of the user operating the user device and comparing the biometric of the user to a biometric template stored on the user device.

4. The method of claim 1, wherein the message is a get processing options (GPO) message.

5. The method of claim 1, wherein the biometric verification is performed in response to receiving the message from the access device.

6. The method of claim 1, wherein the biometric verification result is signed using a signing key on the user device.

7. The method of claim 1, wherein the method allows the user to access a secure location using the user device.

8. The method of claim 1, wherein the user device is in the form of a card.

9. The method of claim 1, wherein the biometric verification is performed using a biometric sensor on the user device.

10. The method of claim 1, further comprising:
    determining from the message that the access device is of a certain type; and
    determining that the verification process is required based on the certain type.

11. The method of claim 1, wherein the user device and the access device communicate using NFC (near field communication).

12. The method of claim 1, wherein the user device is a credit card or a debit card, and wherein the biometric verification is a fingerprint verification.

13. A method performed by at least a user device comprising a processor, and a computer readable medium comprising an interaction application and a biometric application, the method comprising:
    receiving, by the interaction application on the user device from an access device, a message;
    performing, by the biometric application on the user device, a biometric verification of a user operating the user device; and
    if the biometric application has a biometric verification result, then the interaction application receives the biometric verification result from the biometric application and continues processing the message, and
    if the biometric application does not have the biometric verification result, then, the interaction application either (i) waits for the biometric verification result from the biometric application before processing the message, or (ii) continues processing the message without the biometric verification result, wherein the biometric application does not have the biometric verification result, and the method further comprises:

determining that a verification process is not required; and providing, by the interaction application to the biometric application, a non-blocking call, which causes the interaction application to wait for a response from the biometric application and then continue processing the message without the biometric verification result.

14. A user device comprising:

a processor; and a non-transitory computer readable medium comprising code executable by the processor for a method comprising:

receiving, by an interaction application on the user device from an access device, a message;

performing, by a biometric application on the user device, a biometric verification of a user operating the user device; and if the biometric application has a biometric verification result, then the interaction application receives the biometric verification result from the biometric application and continues processing the message, and if the biometric application does not have the biometric verification result, then, the interaction application either (i) waits for the biometric verification result from the biometric application or (ii) continues processing the message without the biometric verification result, wherein the biometric application does not have the biometric verification result, and the method further comprises:

determining, by the interaction application on the user device, that a verification process is required to continue processing the message; and providing, by the interaction application to the biometric application, a blocking call, which causes the interaction application to wait for the biometric verification result from the biometric application before processing the message.

15. The user device of claim 14, further comprising a biometric sensor coupled to the processor.

16. A method comprising:

transmitting, by an access device to a user device, a message, wherein the user device receives the message at an interaction application on the user device, performs, by a biometric application on the user device, a biometric verification of a user operating the user device, and if the biometric application has a biometric verification result, then the interaction application receives the biometric verification result from the biometric application and continues processing the message, and if the biometric application does not have the biometric verification result, then, the interaction application either (i) waits for the biometric verification result from the biometric application before processing the message, or (ii) continues processing the message without the biometric verification result, wherein the biometric application does not have the biometric verification result, and the interaction application determines that a verification process is required to continue processing the message, and provides to the biometric application, a blocking call, which causes the interaction application to wait for the biometric verification result from the biometric application before processing the message; and responsive to transmitting the message, receiving another message from the user device.

17. The method of claim 16, wherein the another message comprises a credential from the user device and the access device is a terminal.

18. The method of claim 16, wherein the access device comprises a gate which moves in response to receiving the another message.

19. The method of claim 16, wherein the another message comprises a credential, the credential being a primary account number.

20. The method of claim 19, wherein the access device is a point of sale terminal.

* * * * *